(12) United States Patent
Kajmo (10) Patent No.: US 12,107,242 B2
(45) Date of Patent: Oct. 1, 2024

(54) BATTERY CELL APPARATUS AND SYSTEM AND METHOD OF USE

(71) Applicant: Paul Kajmo, Warminster, PA (US)

(72) Inventor: Paul Kajmo, Warminster, PA (US)

(*) Notice: Subject to any disclaimer, the term of this patent is extended or adjusted under 35 U.S.C. 154(b) by 0 days.

(21) Appl. No.: 17/972,685

(22) Filed: Oct. 25, 2022

(65) Prior Publication Data

US 2024/0072316 A1    Feb. 29, 2024

Related U.S. Application Data

(60) Provisional application No. 63/271,139, filed on Oct. 23, 2021.

(51) Int. Cl.
*H01M 10/44* (2006.01)
*H01F 1/00* (2006.01)
(Continued)

(52) U.S. Cl.
CPC ........ *H01M 10/443* (2013.01); *H01F 1/0018* (2013.01); *H01M 4/9091* (2013.01);
(Continued)

(58) Field of Classification Search
CPC .......... H01M 10/443; H01M 10/446; H01M 10/441; H01M 10/425; H01M 10/46;
(Continued)

(56) References Cited

U.S. PATENT DOCUMENTS

| | | | |
|---|---|---|---|
| 2007/0218321 A1* | 9/2007 | O'Brien | H01M 10/4235 429/81 |
| 2016/0084911 A1* | 3/2016 | Mensah-Brown | G01R 31/392 324/426 |

(Continued)

*Primary Examiner* — Raymond Alejandro
(74) *Attorney, Agent, or Firm* — LaMorte & Associates P.C (57) ABSTRACT

A battery cell, driven by heat, having a reservoir containing a redox couple electrolyte comprised of paramagnetic and diamagnetic ions. A magnet with a pole, projecting a non-uniform magnetic field unto the electrolyte, the magnetic field having a strong magnetic field area proximal to the magnetic pole and a weak magnetic field area distal to the magnetic pole. A positive electrode is placed in the strong magnetic field area and a negative electrode is placed in the weak magnetic field areas of the electrolyte. Ionic separation occurs as the paramagnetic ions drift to the strong magnetic field area, and the diamagnetic ions are repulsed from the magnetic pole and drift to the weak magnetic field area, causing voltage potential across the positive and negative electrodes. A circuit placed across the positive and negative electrodes of the battery draws electrons from the diamagnetic ions through the negative electrode and the electrical circuit to the positive electrode and into the paramagnetic ions. Paramagnetic ions in the strong field area reduce into converted diamagnetic ions as the paramagnetic ions receive electrons through the positive electrode, the converted diamagnetic ions repelled by the magnetic pole drift to the weak magnetic field area. Additionally, diamagnetic ions proximal to the weak magnetic field area oxidize into converted paramagnetic ions as the diamagnetic ions lose electrons through the negative electrode, the converted paramagnetic ions attracted to the magnetic pole drift to the strong magnetic field area.

21 Claims, 9 Drawing Sheets

(51) Int. Cl.
   *H01M 4/90* (2006.01)
   *H01M 10/42* (2006.01)
   *H01M 10/46* (2006.01)
   *H01M 10/613* (2014.01)

(52) U.S. Cl.
   CPC ......... *H01M 10/425* (2013.01); *H01M 10/46* (2013.01); *H01M 10/613* (2015.04)

(58) Field of Classification Search
   CPC ............ H01M 10/613; H01M 4/9091; H01M 4/9041; H01F 1/0018
   See application file for complete search history.

(56) References Cited

U.S. PATENT DOCUMENTS

| | | | |
|---|---|---|---|
| 2019/0288278 A1* | 9/2019 | Barnes | H10N 70/235 |
| 2022/0262578 A1* | 8/2022 | Wei | H01G 11/36 |

* cited by examiner

BATTERY CELL APPARATUS AND SYSTEM AND METHOD OF USE

CROSS-REFERENCE TO RELATED APPLICATION

The present application claims priority from U.S. Provisional Patent Application Ser. No. 63/271,139, filed on Oct. 23, 2021, which is incorporated herein by reference in its entirety.

BACKGROUND OF THE INVENTION

Field of the Invention

The present invention relates to a battery cell apparatus.

Background

Batteries are used in many different applications and devices and come in many different shapes and sizes. Batteries require charging and recharging to provide the power stored by the batteries and consumed by the device(s) being powered by the battery or batteries. Existing power sources used to charge and recharge batteries include electrically supplied power outlets, solar powered power chargers, motion activated charging of batteries etc., which have limitations such as required to be in proximity to an electrical outlet, having a charger, having a charging cable and proper connection to the charging device, having quality sun/solar available for a solar charger, and the like. It would be beneficial to provide a battery cell with simplified charging characteristics which limit or eliminate these limitations, such as a battery which generates electrical power through heat transfer to the battery.

SUMMARY OF THE INVENTION

This summary is an introduction of concepts which are further discussed in the Detailed Description. This summary is not intended to identify key features or essential features of the claimed subject matter, nor is it intended to be used to limit the scope of the claimed subject matter.

A first exemplary embodiment of the present invention relates to an endothermic reaction electrochemical battery cell apparatus and method of use. The battery cell, driven by heat transfer to the cell, has a reservoir holding a redox couple electrolyte comprised of paramagnetic and diamagnetic ions. A magnet, with a magnetic pole, projects a non-uniform magnetic field unto the electrolyte, and the magnetic field has a strong magnetic field area proximal to the magnetic pole and a weak magnetic field area distal to the magnetic pole. A positive electrode is placed in and/or proximal to the strong magnetic field area and a negative electrode is placed in and/or proximal to the weak magnetic field areas of the electrolyte. Ionic separation occurs as the paramagnetic ions are attracted to and drift to the strong magnetic field area, and the diamagnetic ions are repulsed from the magnetic pole and drift to the weak magnetic field area, causing a voltage potential across the positive and negative electrodes of the cell.

An electrical load and/or circuit placed across the positive and negative electrodes of the battery will draw electrical current and/or electrons from the diamagnetic ions through the negative electrode and the electrical circuit to the positive electrode and into the paramagnetic ions of the electrolyte. The paramagnetic ions in the strong field area reduce into converted diamagnetic ions as the paramagnetic ions receive electrons through the positive electrode, the converted diamagnetic ions are repelled by the magnetic pole and drift to the weak magnetic field area. Diamagnetic ions proximal to the weak magnetic field area reduce into converted paramagnetic ions as the diamagnetic ions lose electrons through the negative electrode. These converted paramagnetic ions are attracted to the magnetic pole and drift towards the pole and the strong magnetic field area. These conversion reactions of the battery are endothermic, drawing heat from and cooling the electrolyte of the cell and drawing heat into the battery from the surrounding environment. In this way, a device with an electrical load can be connected to the battery cell via the positive and negative electrode and be powered by this battery cell.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

For purposes of this description the terms "connected," "linked," "associated," "united," "joined," "combined," "banded," others not mentioned here, refer to any manner known in the art or later developed wherein any item or items are brought together into contact or association in some respect. Additionally, the interposition of one or more additional elements may be contemplated, although not required. Conversely, the terms "directly coupled," "directly connected," etc., imply the absence of such additional elements.

Additionally, for purposes of this description, the terms "process," "system," "method," "operation," are used to describe at least one of a system and method capable of at least one of performing a series of actions or steps taken in order, or generally, in order to achieve a particular result. Additionally, for purposes of this description, the terms "process" and "method" are used interchangeably.

For additional purposes of this description, the term "connected," is used to describe at least of one of an "connection," "link point," "attachment," others not mentioned here.

For additional purposes of this description, wall, side, face, surface, may be used to define a portion of a component, such as an outside surface, inside surface, a horizontal or vertical surface, others not mentioned here.

For additional purposes a battery, cell, battery cell may be used to define a device and/or container consisting of one or more cells where at least one of chemical energy and magnetic energy develops electricity for use as a power source.

For additional purposes of this description, a cover, frame, cap, housing, tank cap assembly, cover assembly may be used to define a think which lies on, over or around something in order to support, house, contain, protect, isolate, others not mentioned here.

For additional purposes of this description, a tank, container, reservoir, cavity may be used to define a receptacle, chamber to contain a gas or liquid, others not mentioned here.

For additional purposes of this description, glue, epoxy, paste, cement, others not mentioned here, may be used to define an adhesive substance used for sticking and/or joining materials together.

For additional purposes of this description, opening, slot, hole, others not mentioned here, may be used to define at least one of a hollow place in a solid body or surface, a narrow aperture and/or slit, gap, access area, others not mentioned here.

For additional purposes of this description, electrode may be used to define at least one electrical description of an element or component, such as at least one of a conductor through which electricity travels, enters, leaves, a positively charged electrode.

In one embodiment of the present invention, a battery cell consists of at least one special electrochemical cell and/or multiple electrochemical cells. At least one of a first and second exemplary embodiment of this invention as described herein, develops voltage by the separation of charge method, whereby a non-uniform magnetic field of a magnet acts upon the magnetic properties of the two types of ions in an electrolyte. The paramagnetic ions are attracted to and drift to the strong magnetic field at the face of the magnet and the magnetic poler. The diamagnetic ions are repelled by the magnetic pole causing drifting of the diamagnetic ions to the weak magnetic field, farther away from the magnet pole and the surface the poles reside thereon. The net result is that essentially all of the paramagnetic ions are at the face of the magnet and essentially all of the diamagnetic ions are farther away from the magnet. If an electrode is immersed in the electrolyte at the face of the magnet area and another electrode is immersed in the electrolyte distal to the face area of the magnet where the diamagnetic ions are located, then at least one of ionic separation and a separation of ionic charge and ion separation and ionic charge separation has been achieved and a voltage will develop across the two electrodes.

This separation of charge capability is obtained by using a unique property of certain ions, such as special ions in this new inventive concept. These special or unique ions, such as redox couple ions in this first exemplary embodiment, possess properties which can be used to cause a separation of ionic charges in the battery cell electrolyte.

The ions utilized in this invention, such as special ions, of which there are many different ones or potential ones, consist of at least one of simple ions (single charged atoms) and complex ions (complex ions may have a metal ion at its center with a number of other molecules or ions surrounding this center) and are may typically be of the same chemical species. These ions possess both a paramagnetic mode in one state of charge, and a diamagnetic mode when in a different state of ionic charge. Paramagnetism is a form of magnetism where certain materials are weakly attracted by an applied magnetic field, such as internally and/or externally, thereby forming induced magnetic fields in the direction of the applied magnetic field. Paramagnetic properties arise when the ground state of an element or compound's orbital electron shells are left with unpaired electrons.

Alternately, diamagnetic materials are, and/or become, repelled by a magnetic field and form induced magnetic fields in the direction opposite to that of the applied magnetic field. Diamagnetism occurs when all orbital electrons are paired up with each other. In at least one present exemplary embodiment, a battery or battery cell, possesses at least one material with the presence of dual ionic status, having both paramagnetic and diamagnetic ions present in the battery electrolyte, which is critical for the present invention and exemplary embodiments. The present invention utilizes a magnet, such as a permanent magnet, incorporated with or thereinto the battery cell, such that the magnet's magnetic field can act upon the magnetic properties of battery cells ions.

This present invention utilizes at least one redox couple, typically of the same chemical species, having both paramagnetic and diamagnetic ions for the self-resetting of the redox couple during battery cell discharge. Same chemical species may be described as when an atom is similar to another atom, they are defined as being the same chemical species. Additionally, this is also true of molecules, in that if one molecule is similar to another, they are the same chemical species. This invention also develops the self-resetting of the redox couple during battery cell discharge allowing the cell to maintain the discharge indefinitely. The electrolyte of this invention is developed by dissolving the above redox couple in distilled water. Additionally, a non-uniform magnetic field, such as supplied by a magnet and/or permanent magnet is used in the present invention. Further additionally, electrodes, such as one electrode in the magnet's strong magnetic field and a second electrode in the weak magnetic field are used to access the charge on the ions in each magnetic field area. These conditions as developed by a battery in this exemplary embodiment and as described herein, will create a separation of charge in the battery cell, which in turn, raises a voltage across the battery cell terminals.

Figure 1:
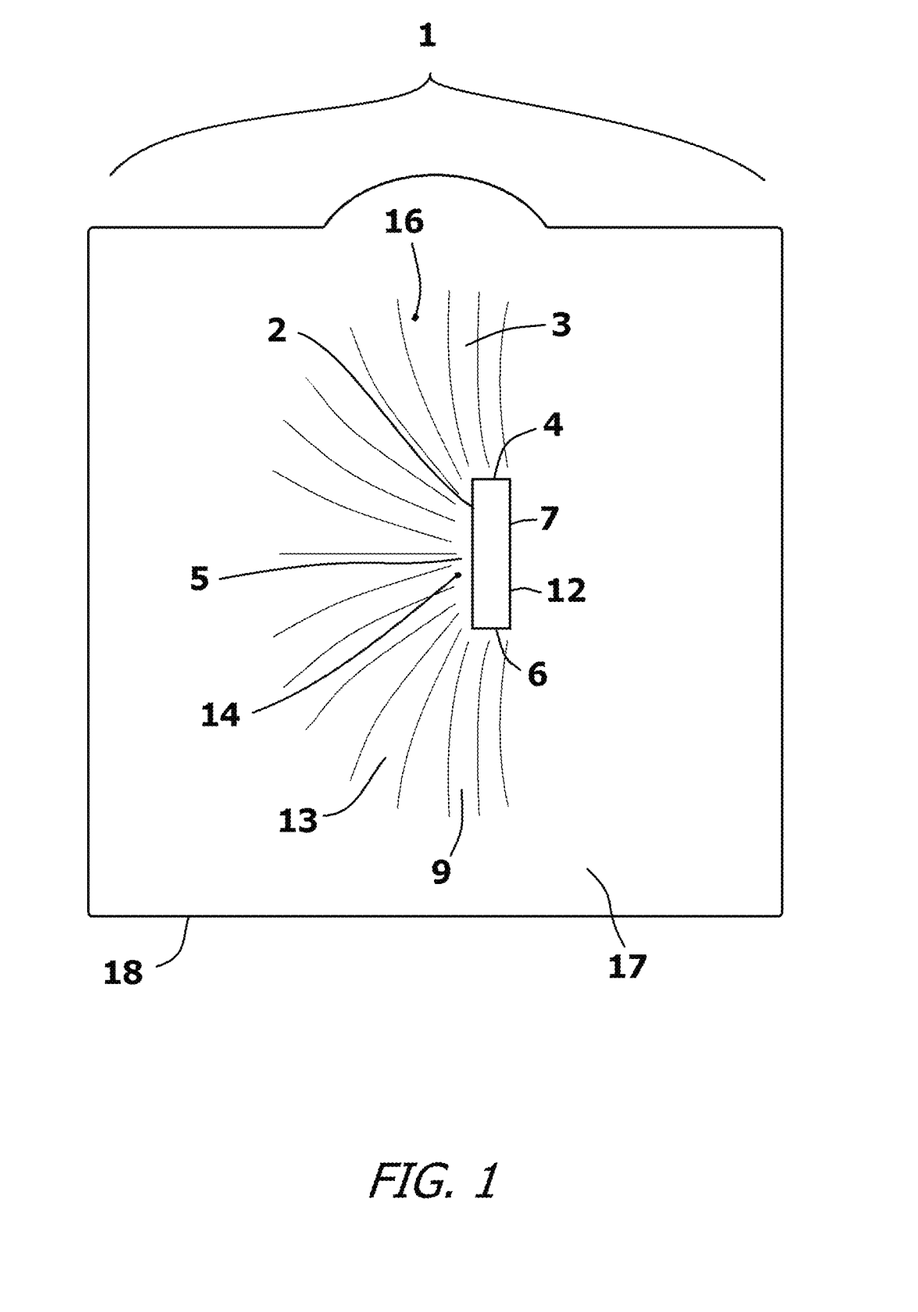
FIG. 1 is a top view of a first battery cell apparatus to an exemplary embodiment of the present invention.

Referring FIG. 1, a top view of battery cell apparatus 1 is shown with magnet 7, whereby magnet 7 has front surface 2, field area 3, side face 4, field area 5, side face 6, field area 9, top 12, magnetic field 13, electrode 14, electrode 16, electrolyte 17, and reservoir 18. Magnet 7 possesses a general geometry, such as an elongate shape and/or a rectangular flat plate mounted vertically with respect to the battery cell and with magnet 7's magnetic pole on the larger forward flat face, such as front surface 2 of FIG. 1. The orientation of at least one of battery cell apparatus 1 and magnet 7 in this fashion provides a horizontal non-uniform magnet field as shown by field lines 13, extending out from at least one flat surface of the magnet such as front surface 2 as shown in FIG. 1. Magnetic field 13, in this present exemplary embodiment, represents at least one portion of the magnetic field of at least one portion of battery cell apparatus 1 and magnet 7, as illustrated in FIG. 1.

Referring FIG. 1, at least one portion of battery cell apparatus 1 and magnet 7 is a permanent magnet, such as incorporated into at least one portion of battery cell apparatus 1, so that the magnetic field of at least one of battery cell apparatus 1 and magnet 7 can act upon magnetic properties of ions placed in proximity to at least one of battery cell apparatus 1 and magnet 7, such as ions located in at least one of electrolyte 17 and reservoir 18 surrounding at least a portion of battery cell apparatus 1 and magnet 7. Alternately, magnet 7 could reside external to battery cell apparatus 1, projecting a magnetic field such as magnetic field 13 thereunto battery apparatus 1.

Referring FIG. 1, the magnetic field or field configuration in areas of higher magnetic field density, such as where magnetic field 13's lines are closer together may be illustrated by field area 5, showing the stronger and/or strongest magnetic area immediately adjacent to front surface 2 of magnet 7.

Similarly, referring FIG. 1, the field configuration with areas of a weaker magnetic field area, such as where the field lines of magnetic field 13 are farther apart, such as illustrated by field area 3 and field area 9, and other areas illustrated by magnetic field 13 where magnetic field lines are one of further away from magnet 7 and spread farther apart from other field lines of magnetic field 13.

Referring FIG. 1, when at least one portion of battery cell apparatus 1 and magnet 7 are placed in a fluid, such as at least one of an electrolytic fluid with paramagnetic and diamagnetic ions, the nonuniform magnetic field, such as represented by magnetic field 13, will draw paramagnetic ions to the strong magnetic area of the magnets front surface 2, while the diamagnetic ions are repelled to the weak magnetic areas further away from the magnet. In this current embodiment, surface 2 is at least one of magnet 7's larger and/or largest surfaces. This is an example of how the nonuniform magnetic field is at least one of projected upon and provided to the electrolyte with the strong magnetic field area and the weak magnetic field area distal to the strong magnetic field area.

Referring FIG. 1, an electrode is at least one of proximal and placed in the strong magnetic area of magnet 7, such as electrode 14, to access the charge on the paramagnetic ions while another electrode, such as electrode 16, is at least one of proximal and placed in the weak magnetic field area to access the charge on the diamagnetic ions. As the ions at each electrode, such as at least one of electrode 14 and electrode 16, have different states of ionic charge, the goal of a separation of charge has been attained by at least one portion of apparatus 1, which in turn raises a voltage, such as a voltage potential, across the battery's electrodes, such as at least one of electrode 14 and electrode 16. In turn, at least one of electrode 14 and electrode 16 may be provided with and/or connected to terminals, such as terminals extending to the external of the battery cell of the present battery invention.

An example of a battery cell for the present invention, such as battery cell apparatus 1 of FIG. 1 may use salts in a fluid and/or aqueous solution, such as the following potassium salt in aqueous solution which can be represented by:

The Redox couple: $K_3[Cr(CN)_6]-4 <-> K_3[Cr(CN)_6]-3 + e$

Where: the $Cr(CN)_6-4$ ion is diamagnetic, and the $Cr(CN)_6-3$ ion is paramagnetic.

This redox couple was selected for the example because it has a cell potential of 1.28 volts at standard conditions. A fluid placed into at least one portion of battery cell apparatus 1, electrolyte 17, and reservoir 18, as shown in FIG. 1, may consist of a saturated solution in distilled water containing both types of the potassium salts complex ions, shown as: $Cr(CN)_6^{-3}$ ions (paramagnetic) AND $Cr(CN)_6^{-4}$ ions (diamagnetic).

Reservoir 18 of FIG. 1 may be an elongate cavity and magnet 7 may be an elongate shape positioned within the reservoir and the magnet having a surface, such as a larger or largest surface, containing at least one magnetic pole, such as surface 2 proximal to magnetic field area 5. With battery cell apparatus 1 on open circuit, the nonuniform magnetic field, such as represented by magnetic field 13 from permanent magnet 7 of FIG. 1, separates the paramagnetic ions from the diamagnetic ions in the electrolytic fluid of electrolyte 17 and reservoir 18, by drawing and/or attracting the −3 ions (paramagnetic) to positive electrode 14 in the strong magnetic area, while the −4 ions (diamagnetic) ions are repelled to negative electrode 16 in the weak magnetic area. Open circuit, as described herein, may be described as at least one terminal of the battery cell apparatus is disconnected from a circuit and/or electrical load and/or external electrical load. An electrical circuit, in this first exemplary embodiment, describes a at least one of a conductor, an electrical conductor, a shunt, an electrical load, others not mentioned here existing across the battery cells electrodes and/or terminals. A terminal, as used for descriptions of battery cell apparatus 1, is the electrical contact used to connect a load to battery, whereby the electrode which is at least one of connected and integral with the terminal of the battery cell apparatus 1. As an example, electrode 14 may be provided with a terminal to connect the positive side of an electrical load to battery cell apparatus 1. Similarly, electrode 16 may be provided with a terminal to connect the negative side of an electrical load to battery cell apparatus 1.

Voltage as described for battery cell apparatus 1 of FIG. 1, and/or voltage potential, can describe voltage at least one of across the battery terminals, across the electrodes, across the anode and cathode of the battery, others not mentioned here. Further, the terminal may be the portion of the battery cell electrode, either positive or negative, which is exposed on the outside of the battery for connection to an electrical load, circuit, others not mentioned here. The battery cell apparatus 1 of FIG. 1 may be connected in series, such as by connecting two or more of battery cell apparatus 1's in series to develop higher voltage than a single battery cell apparatus 1 may develop singularly. Similarly, battery cell apparatus 1 of FIG. 1 may be connected in parallel, such as by connecting two or more of battery cell apparatus 1's in parallel to develop higher current than a single battery cell apparatus 1 may develop singularly.

When at least one battery cell, such as one battery cell apparatus 1, or a plurality of battery cell apparatus 1 in series, is connected to an external load, the voltage at the terminals of the at least one battery cell apparatus 1 of FIG. 1, created by the separation of charge in the electrolyte as described herein, will drive an electrical current, such as the flow of electrons, through an attached load.

At the start of the at least one battery cell apparatus 1 discharge, the −4 diamagnetic ions at the negative electrode, such as electrode 16, undergo a reduction reaction (reduction reactions involves a gain of electrons) to supply electrons to the external load, using the convention whereby electrons come from the negative terminal of the battery. Similarly, the −3 paramagnetic ions at the positive electrode undergo an oxidation reaction (an oxidation reactions involves a loss of electrons) to accept electrons from the connected load. As this occurs, the states of charge on each type of the ions contained in battery cell apparatus 1 become converted and/or reversed. Converted and/or reversed, as used herein, is described whereby the paramagnetic −3 ions in the strong magnetic field area proximal to positive electrode 14 oxidize and/or are oxidized by losing electrons into −4 diamagnetic ions such as converted diamagnetic ions. These converted diamagnetic ions will then be repulsed by the magnetic pole and will drift towards the weak magnetic field area and negative electrode. Similarly, the diamagnetic −4 ions of negative electrode 16 proximal to the weak magnetic field area oxidize and/or are oxidized to the −3 (paramagnetic) state into converted paramagnetic ions and will drift towards the strong magnetic field area and positive electrode. This converting of these ions occurs such as during the discharge of battery cell apparatus 1, comprising the flow of electrons from the diamagnetic ions through the negative terminal of the battery, through an electrical circuit connected to the negative and positive terminals of the battery, and into the positive electrode of the battery and into the paramagnetic ions of the electrolyte proximal to the positive electrode, may include a discharge reaction, involving the exemplary state of ionic charge performed by:

1. An oxidation reaction at negative electrode 16 characterized by:

$Cr(CN)_6^{-4}$ ion (diamagnetic) minus 1 electron->$Cr(CN)_6^{-3}$ ion (paramagnetic) AND
2. A reduction reaction at positive electrode 14 characterized by:

Cr(CN)6-3 ion (paramagnetic) plus 1 electron->Cr(CN)6-4 ion (diamagnetic)

The ions in their new states of charge are now in their improperly oriented (wrong) magnetic field areas, a result of the discharge of at least one portion of battery cell apparatus 1. The magnetic field provided by permanent magnet 7 FIG. 1 of battery cell apparatus 1, sorts and causes the movement/drifting of the ions as they change their state of charge by continuously attracting and/or drifting the newly developed paramagnetic ions to the strong magnetic field area, such as field area 5, and repelling the newly converted diamagnetic ions to the weak magnetic field area, such as at least one of field area 3 and 9 of FIG. 1. In this manner, the battery will continue to supply an electric current until the electrical load and/or circuit is disconnected (the ions do not wear out and/or deplete, and the magnetic field is "permanent").

The current exemplary embodiment as described herein, such as battery cell apparatus of FIG. 1, possesses the ability to supply at least one of electrical current and energy and power for an extended period of time, such as years without the need for recharge. Battery cell apparatus 1 has this capability because the cell internal reactions of battery cell apparatus 1 are endothermic, meaning that at least one portion of the battery cell, such as the fluidic electrolyte of electrolyte 17 of FIG. 1, will cool down during battery operation to below the temperature of the battery's surroundings, causing at least one portion of battery cell apparatus 1, such as the fluid electrolyte of electrolyte 17, to begin the absorption of heat from the surroundings. As such, battery cell apparatus 1 has the ability to convert this absorbed heat energy into electrical energy through the continued cyclical operation of the battery as described herein.

In the present invention, the review of the chemical reactions occurring in both the positive and the negative electrode follows:

Negative electrode: The electrons that make up the electrical current come out of the cell at this electrode, where the diamagnetic ions in the electrolytes are located. These ions readily give up their electrons as the cell voltage drives all of the cell's internal reactions to create the electrical current. When the diamagnetic ions give up their electrons to the negative electrode, a reduction reaction occurs at the electrode surface and thus the negative electrode is protected from corrosion in both positive and negative ion cells.

Positive electrode: This electrode receives the electrons from the negative electrode via the external circuit. However, it is necessary for the electrons to be passed on to the ions in the electrolyte to complete the transformation process of those ions. By transferring the electrons onto the ions, the positive electrode undergoes an oxidation reaction (a loss of electrons) at its surface. The result, using ordinary metals for the positive electrode, is the creation of positive electrode metal ions that then pass into and contaminate the electrolyte. The positive electrode can be made resistant to the oxidation reactions that occur at its' surface by employing oxidation resistant materials and/or chemically inert substances. Commonly used oxidation-resistant and chemically inert materials may include platinum, gold, graphite, and others not mentioned here. Additionally, the use of ferrite materials may offer an additional feature—the ferrites can also be magnetized to provide the non-uniform magnetic field. The positive electrode thus becomes the magnet and thereby eliminates the need for a separate magnet within the cell.

The basis of the present exemplary invention is a battery at ordinary temperatures and magnetic field strength, is the magnetic field energy transferred to the paramagnetic ions is small compared to the kinetic energy of thermal agitation and/or heat transfer to the battery cell. Thermal agitation is a random process and thus has no preferred direction. The magnetic energy, however, is directed along the lines of the magnetic field and so produces a resultant drift of the ions toward their respective electrodes.

The present exemplary invention utilizes redox pairs that are made up of either positively charged or negatively charged ions (as long as either type of redox couple possesses both paramagnetic and diamagnetic forms of its ions). The sorting of the ions by the magnet's non-uniform field causes the ions at one electrode to be either more positive (if both ions are positive) or more negative (if both ions are negative) than the ions at the cell's other electrode. This condition is known as "separation of charge". When this state (separation of charge) is achieved in an electrochemical cell, a voltage is raised between the cell's positive and negative terminals.

Figure 2:
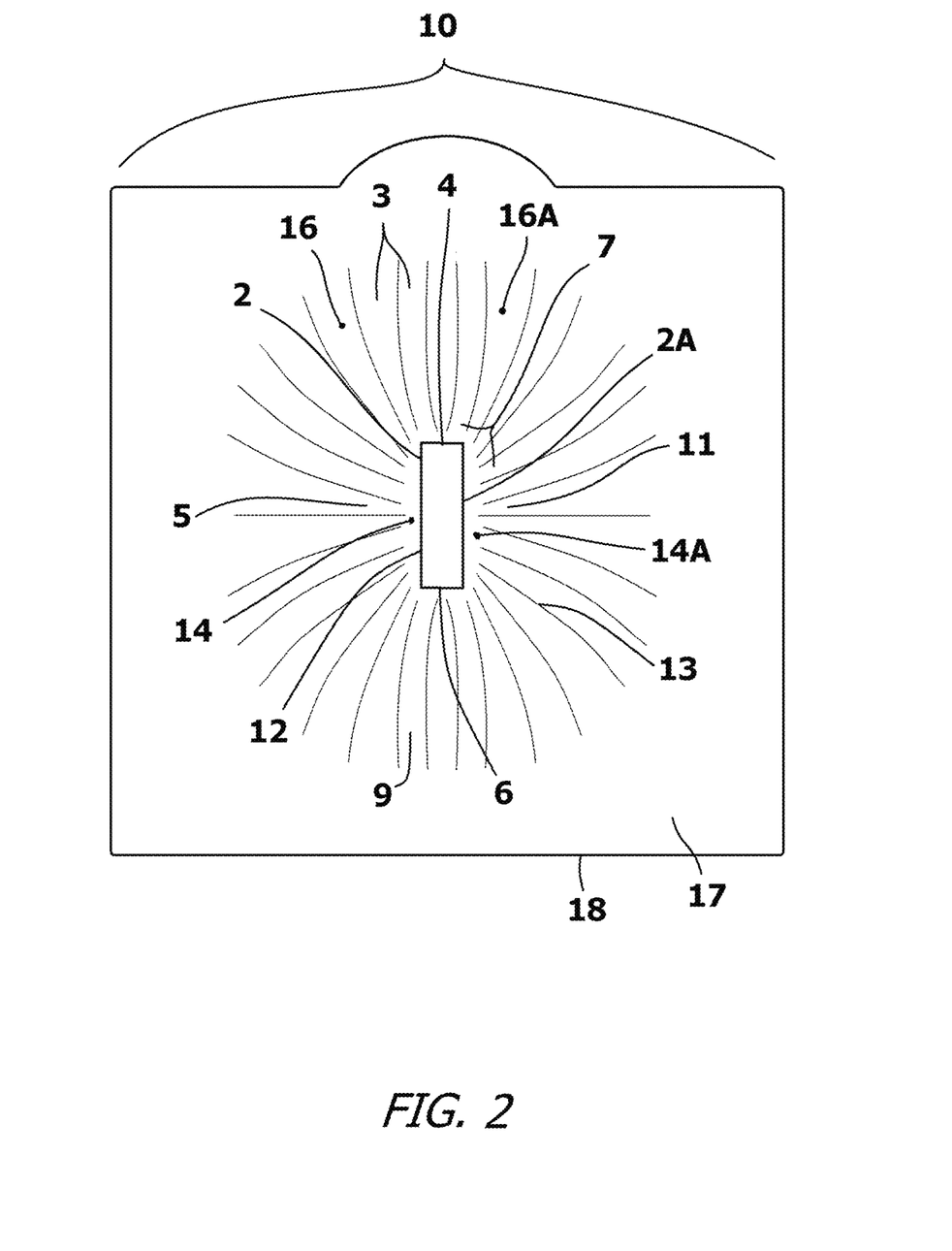
FIG. 2 is a top view of a second battery cell apparatus according to an exemplary embodiment of the present invention.

Referring FIG. 2, a top view of battery cell apparatus 10 is shown with at least one electromagnetic field, such as field 13, on sides of magnet 7, including sides adjacent to surfaces 2, 2A, 4 and 6. Also shown in FIG. 2, with similar function and/or operation as described for similarly numbered elements of FIG. 1, are field area 3, face 4, field area 5, face 6, field area 9, top 12, magnetic field 13, electrode 14, electrode 16, electrolyte 17, and reservoir 18. FIG. 2 differs from FIG. 1, in that field 13 is shown fully surrounding magnet 7. In addition, FIG. 2 differs from FIG. 1 in that a second pair of electrodes, such as electrode 14A and electrode 16A, have been added to the battery cell to enable the battery cell apparatus 10 to develop and/or provide at least one of higher potential, voltage, ampacity, power, others not mentioned here. Positive electrode 14 of field area 5 is connected with electrode 14A, also a positive electrode located in a strong field area of battery cell apparatus 10, such as field area 11.

Negative electrode 16 is connected with electrode 16A, also a negative electrode located in a weak field area of battery cell apparatus 10, such as at least one of field area 3 and field area 9. Field area 11 is also shown adjacent to front surface 2A, illustrating a magnetic field area location similar to field area 5 adjacent to front surface 2 on the opposite side of magnet 7. The illustration of the surrounding magnetic field of FIG. 2 and battery cell apparatus 10 also illustrates increased areas and/or volumes such as for field areas 3 and 9, as well as reservoir 17.

FIG. 2 illustrates the ability to add at least one of an additional electrode and an additional field area and others not mentioned here, to increase the performance of the battery, such as battery cell apparatus 10. While FIG. 2 shows the addition of a pair of electrodes and at least one additional field area, it is not intended to limit the addition of additional items regarding the inventive concept of this invention, such as at least one additional electrode and field areas and electrolyte reservoir and others not mentioned here. A plurality of positive electrodes and negative electrodes could be used in the current invention, and methods of increasing the surface areas of these electrodes could also be used to enhance the performance of the battery cell.

In colder environments, the electrolyte fluid of at least one of the battery cell apparatus 1 of FIG. 1 and battery cell apparatus 10 of FIG. 2, may employ an anti-freeze addition for winter time operation due to the lower environmental conditions and the internal endothermic cooling reactions. Examples of anti-freeze may include commercially available solutions such as propylene glycol and ethylene glycol, salts, brines, others not mentioned here.

Figure 3:
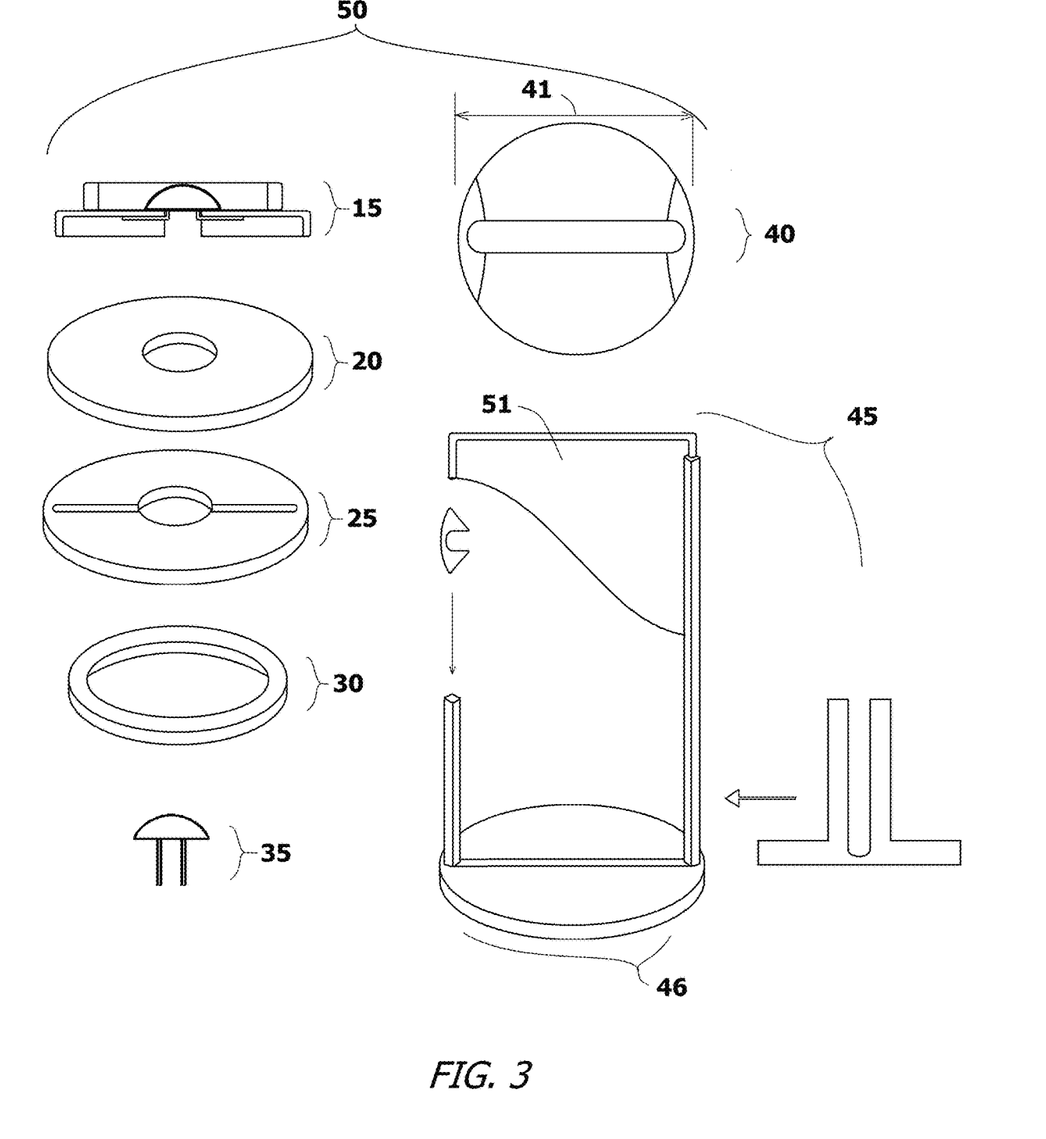
FIG. 3 illustrates a disassembled view of perspective and side views of a battery cell according to a first exemplary embodiment of the present invention.

Referring FIG. 3, battery 50 illustrates the construction of a battery cell apparatus, such as representative of the technology of at least one of battery cell apparatus 1 of FIG. 1 and battery cell apparatus 10 of FIG. 2, into an exemplary embodied battery. Referring FIG. 3 battery 50 comprises at least one of cover assembly 15 and cap 20 and base 25 and ring 30 and fastener 35 and housing 40 and frame assembly 45. Frame 45 assembly of FIG. 3 is shown with magnet 51. Referring FIG. 3, at least one of battery cell apparatus 1 of FIG. 1 and battery cell apparatus 10 of FIG. 2, may be developed into this exemplary embodiment battery, such as a small utility battery cell in any one of common battery sizes, such as D, C, AA, AAA, battery cells larger than the cells listed herein, battery cells smaller than battery cells listed herein, others not mentioned here.

Figure 4:
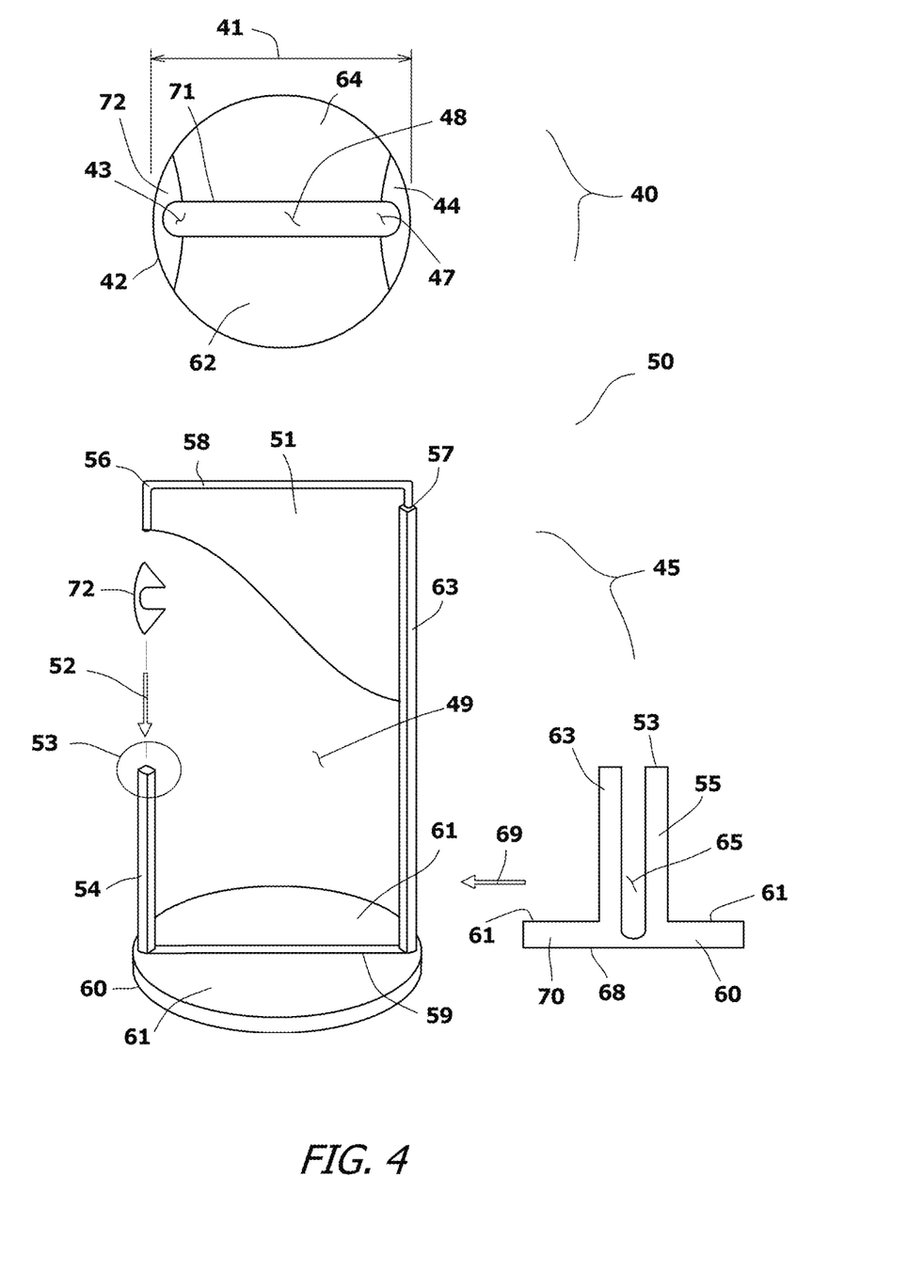
FIG. 4 illustrates a detailed top view of a battery cell housing and a detailed perspective view of a battery cell frame according to a first exemplary embodiment of the present invention.

Referring FIG. 4, housing 40 includes diameter 41, wall 42, side opening 43, side 44, side opening 47, cavity 48, surface 62, surface 64, opening 71, side 72, others not mentioned here. Additionally, FIG. 4 shows frame 45 including cavity 49, magnet 51, direction 52, interphase 53, bar 54, bar 56, top 57, magnet top 58, bottom area 59, base 60, bottom face 61, bar 62, bar 63, opening 65, bottom 68, direction 69, body 70, others not mentioned here. Also shown with frame 45 of FIG. 4 is side 72 correlating to the interconnectivity of frame 45 with housing 40, as well as direction 52 indicating a direction used to assemble housing 40 with frame 45. Cavity 48 and 49 may be at least one of various shapes, such as an elongate shaped cavity.

Figure 5:
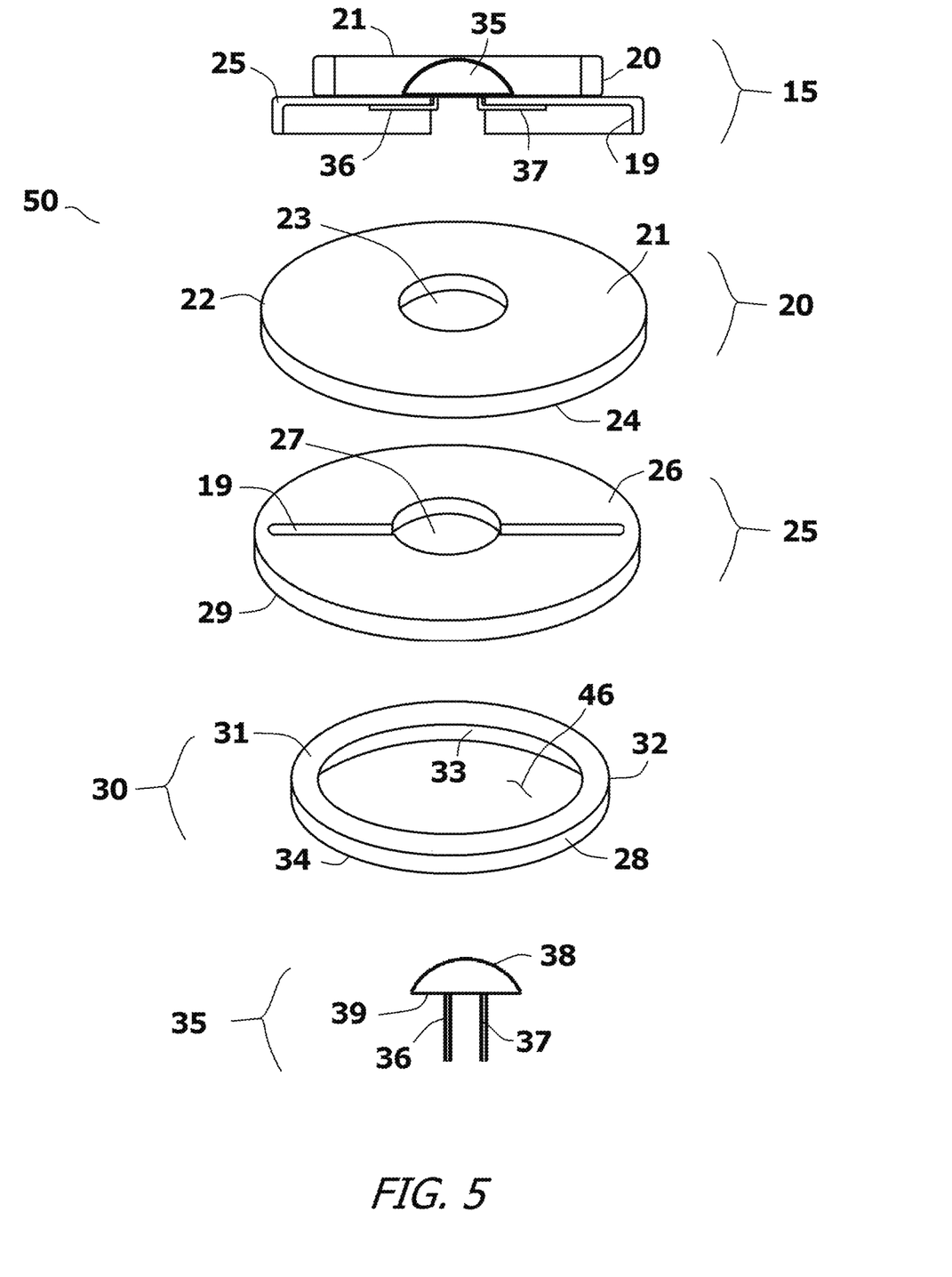
FIG. 5 illustrates a detailed side view of a battery cell cover assembly, a fastener, and a detailed perspective views of a battery cell cap and base and ring according to a first exemplary embodiment of the present invention.

The assembly of the battery, such as battery 50 of FIG. 3 and battery 50 components shown in FIGS. 4, 5, may begin by the application of a thin layer of setting paste, such as a soft inert setting paste or silicone-based caulk, thereunto at least one portion of the inside of housing 40 and frame 45, such as surface 61, base 60, surface 62, surface 64, any surface connected to wall 42, others not mentioned here, to keep electrolytic fluid, such as electrolytic fluid carrying ions from at least one portion of these areas. Magnet 51 can be inserted into a holding frame, such as frame 46, creating magnet and frame assembly 45, whereby magnet and frame assembly 45 is placed thereunto at least one portion of housing 40 to engage any setting paste on at least one portion of housing 40, such as at least one portion of the bottom of housing 40, surface 62, surface 64, any surface connected to wall 42, others not mentioned here. In all battery sizes, such as various sizes of battery 50 of FIG. 3, the magnet and frame assembly 45 can be placed in any angular location with respect to housing 40's angular position during the insertion of magnet 51 into frame 45 of FIGS. 3 and 4. Once magnet and frame assembly 45 has been inserted into housing 40, fluid electrolyte can then be added to the internal cavity of the combined assembly, such as at least one of cavity 49 of frame 45 and cavity 48 of housing 40. The addition of electrolyte is generally limited to no higher than the top area 57 of frame 45 of FIG. 4 and should not be filled to the top 58 of magnet 51.

Referring FIGS. 3 and 5, cover assembly 15 combines with magnet and frame assembly 45 to complete the assembly of battery 50 of FIG. 3. While at least one portion of battery 50 of FIGS. 3, 4 and 5 is shown in exploded or dis-assembled view for illustrative purposes, the battery of 50 of FIGS. 3, 4 and 5 develops an assembled battery unit. Cover assembly 5 of FIG. 5 is comprised of cap 20, base 25, ring 30 and fastener 35, when these components are combined. FIG. 5, additionally illustrates cap 20 of cover assembly 15 comprised of opening 23, wall 22, front surface 21 and bottom 24. Further additionally FIG. 5 illustrates base 25 comprised of opening 19, opening 27, bottom 29, front surface 26 and wall 28. Further additionally FIG. 5 illustrates ring 30 with top 31, wall 33, wall 32 and bottom 34. Lastly, FIG. 5 illustrates fastener 35 as shown in FIG. 5 is comprised of post 36, post 37, head 38 and face 39. Fastener 35 may be comprised of at least one material such as conductive, metallic, copper, others not mentioned here. Referring FIGS. 3 and 5, cover assembly 15 has a ring, such as ring 30, adapted to locate atop cover assembly 15 with a through hole, such as provided by at least one of opening 23 of cap 20 and opening 27 of base 25 and opening 46 of ring 32, whereby a fastener such as fastener 35 may pass therethrough. Ring 30 may be provided in at least one of an elastomer, semi-hard, semi-soft, to provide a compressible seal thereunto at least one portion of cover assembly 15. FIG. 5 illustrates the fully assembled cover assembly 15, with post 36 and post 37 of fastener 35 shown as folded outward 90 degrees so that they lay and/or locate in the bottom of the slotted opening developed thereunto cover assembly, such as by opening 19 of base 25 in this first exemplary embodiment. The underside of fastener 35, such as face 39 of FIG. 5, is coated with sealant, such as at least one of a setting and sealing paste, to prevent electrolyte leakage and/or loss through the hole after the battery cell, such as battery 50 of FIG. 3 is sealed when assembled.

Cover assembly 15 of FIGS. 3 and 5 is pressed down onto the top of magnet 51 of FIG. 3 until the magnet is fully seated upon at least one of frame portion of magnet and frame assembly 45 of FIG. 3, whereby at least one post of fastener 35, such as post 36 and post 37 of the fastener 35 is in contact with the top of magnet 51. A coating of paste, such as setting or sealing past, is applied to the top surface of ring 30, such as top 31, as well as to at least one surface and/or edge of cover assembly 15 of FIG. 5, to prevent loss of electrolyte.

To complete the assembly of the battery 50 of FIG. 3, a top plate, such as a finishing or cosmetic top may be placed atop cover assembly 15. A thin plastic film with a hole in its center may be attached to the underside of said top plate to prevent electrical contact between the top plate and housing 40 during any crimping operation to assemble at least one portion of battery 50 of FIG. 3. Application of force and/or pressure to the top plate to compress the top plate and ring 30 downward until the bottom of the top plate makes electrical contact with fastener 35, such as a copper rivet. At this point, a top edge of the housing, such as the top edge of housing 40, is crimped over the cosmetic top plate. Additionally, a base plate may be added to the bottom of the housing. Finally, a plastic sleeve is slipped over at least one of housing 40 and the base plate and shrink-wrapped into position, such as through the application of heat. Battery 50 of FIG. 3 is now ready for use.

Figure 6:
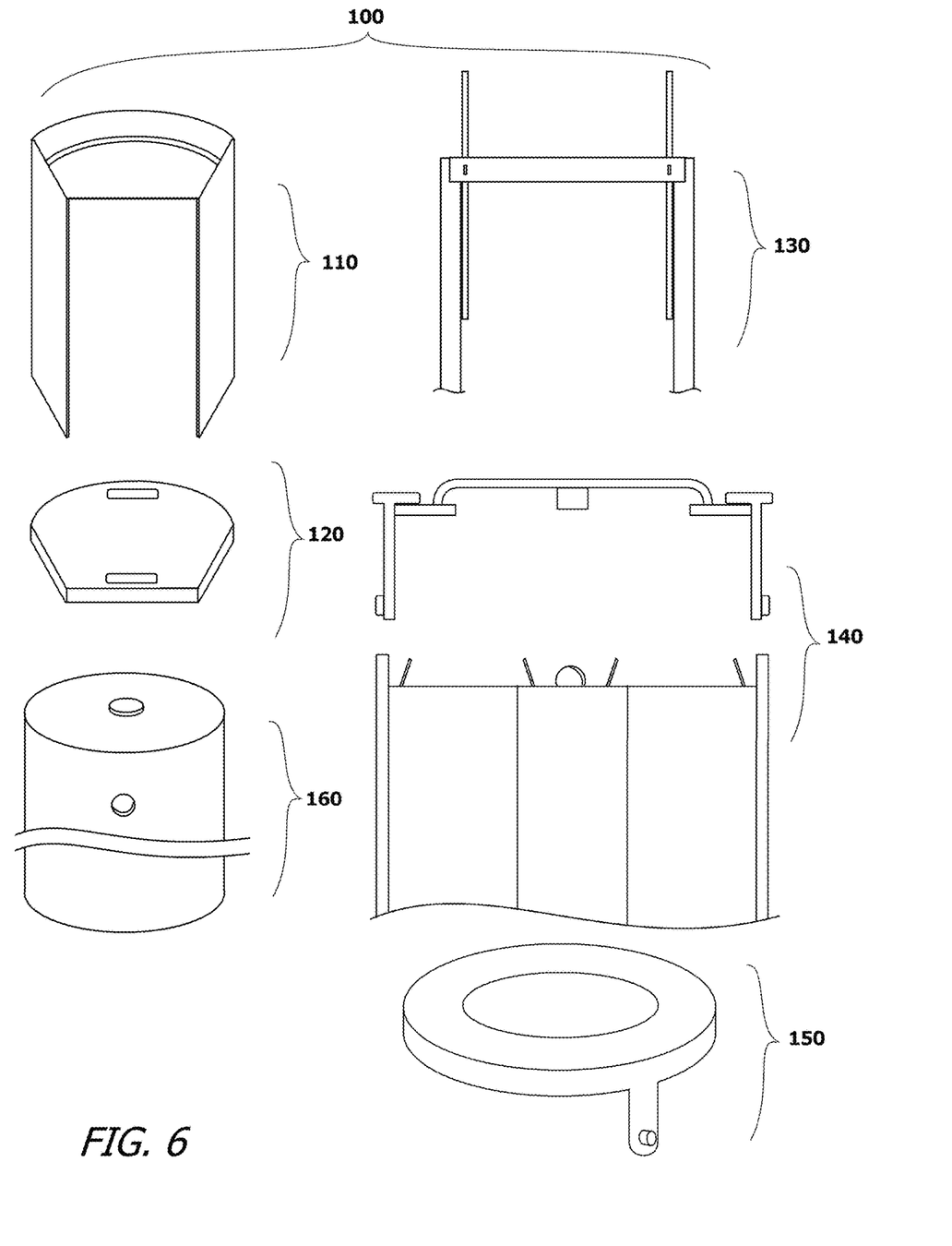
FIG. 6 illustrates a perspective view of battery cell tank and cover and housing and cap, as well as side views of tank assembly and cell cap assembly according to a second exemplary embodiment of the present invention.

Referring FIG. 6, a second exemplary embodiment of the present invention is shown by battery cell apparatus 100 comprised of tank 110, cover 120, housing 160, tank assembly 130, cell cap assembly 140 and cap 150. Battery cell apparatus 100 is shown to illustrate large battery cells, such as industrial and electric vehicle (EV) applications, of the present invention. This second exemplary embodiment of the present invention can furnish a continuous electrical current to a power grid in locations where excess waste heat is readily available, such as in and around nuclear power stations and industrial plants.

Figure 9:
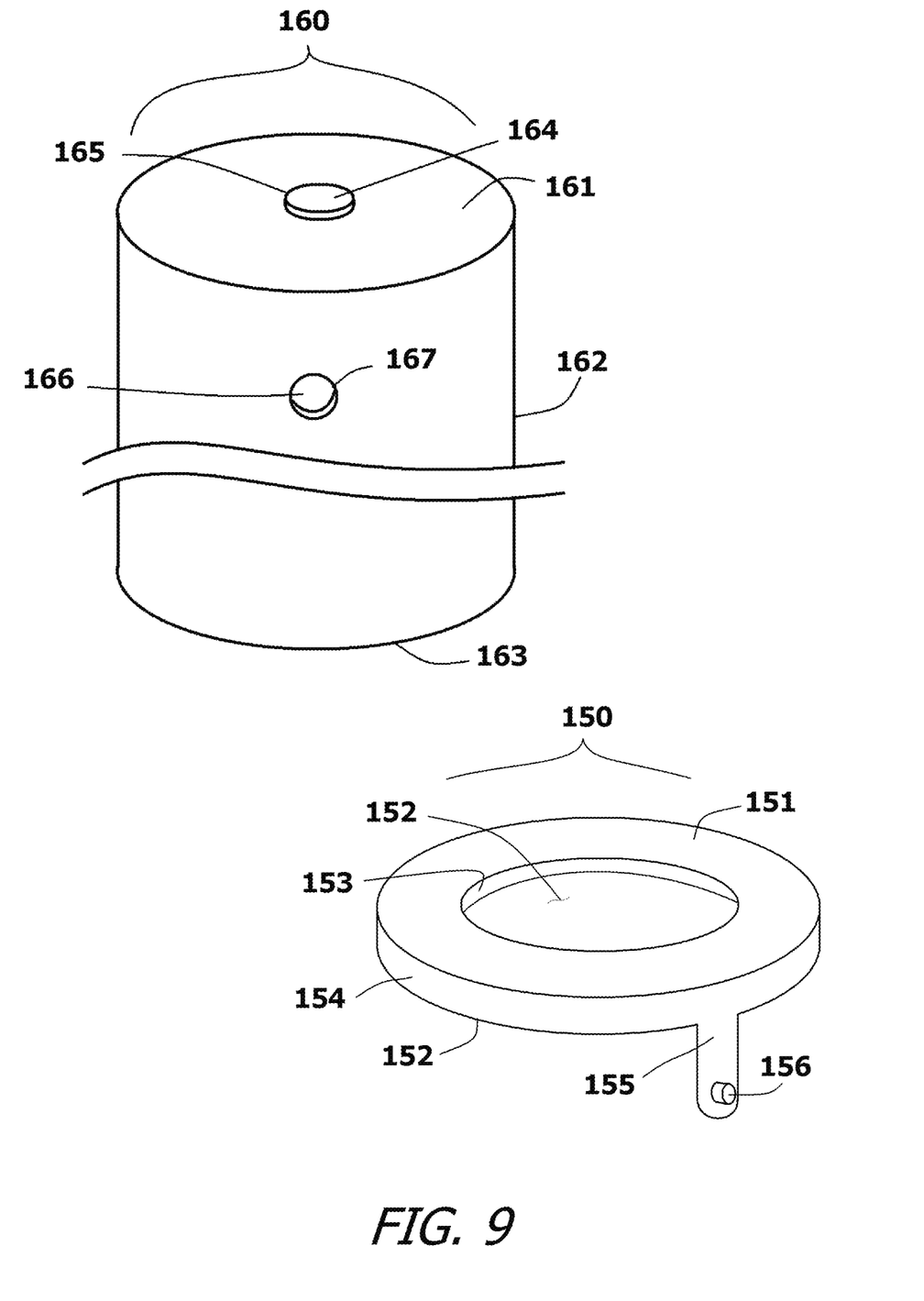
FIG. 9 illustrates detailed perspective views of a battery cell cap and housing according to a second exemplary embodiment of the present invention.

Referring FIGS. 6 and 9, a battery housing such as housing 160 may be a metal housing to contain battery cell apparatus 100 of FIG. 6 in larger EV and electric utility power battery cell sizes to promote heat transfer into the battery during discharge.

Referring FIGS. 6 and 9, housing 160 is comprised of opening 164 and opening 167, wall 162, face 165, face 167 and bottom 163. In the present exemplary embodiment as shown in FIG. 9, housing 160 is at least one portion metal, has two through holes, opening 164 and opening 167, located in wall 162 some distance from top 161, such as approximately 1 inch down from top 161 of housing 160 and with opening 164 and 167 located such as opposing at 180 degrees apart. Openings 164 and 167 allow the cell cap assembly, cap 150, to be latched into position at completion of the battery 100 assembly. Additionally, as shown in FIGS. 6 and 9, cell cap 150 is comprised of opening 152, top 151, wall 153, wall 154, bottom 157, post 155, and lug 156, others not mentioned here.

The magnet used in all sizes of the battery cell is as described herein, may be preferably a rectangular flat plate mounted vertically with the magnetic poles on the flat sides, such as magnet 51 of FIG. 4, differing only in size (length, width and thickness) needed to meet electric current capacity requirements. In very large cells, the magnet used in the present invention, such as with battery 100 of FIG. 6, can be increased in thickness, or other size, for greater magnetic strength. The battery's magnet, such as at least one of magnet 7 of FIGS. 1 and 2, and magnet 51 of FIG. 4 for use with battery 100 of FIG. 6, has poles on the magnet's vertical sides so the magnetic fields radiate outward horizontally, giving two non-uniform fields, one from each side of the magnet as shown in FIG. 2. This configuration allows the use of two separate electrolyte tanks, such as two tank 110s of FIG. 6 in one housing, such as housing 160 of FIGS. 6 and 9.

Figure 7:
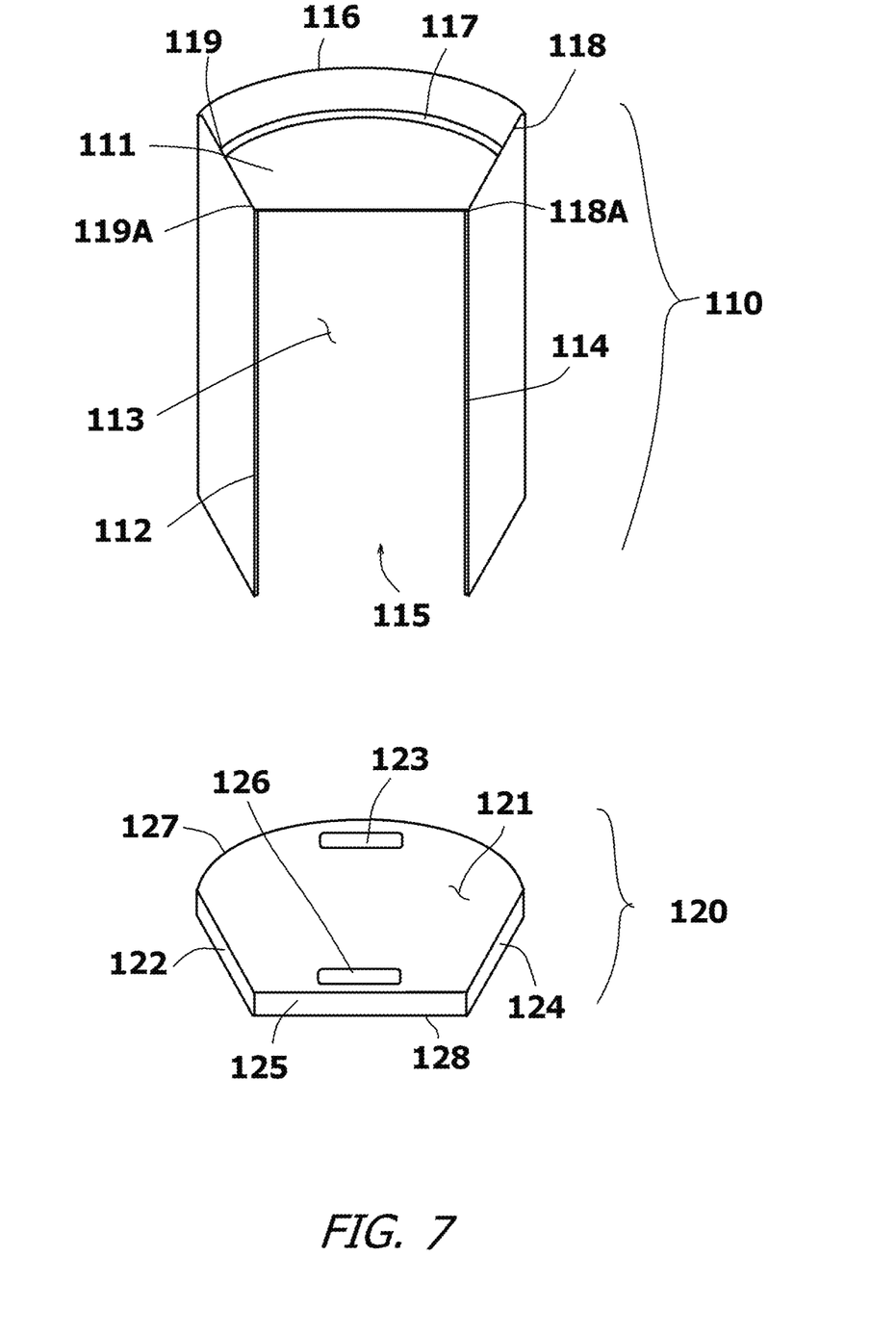
FIG. 7 illustrates a detailed perspective view of a battery cell tank and cover according to a second exemplary embodiment of the present invention.

Following the first exemplary embodiment used in a small cell battery, such as battery 50 of FIG. 3, a second exemplary embodiment, such as battery 100 of FIG. 6, the magnet used in large or electric vehicle applications, such as magnet 51 of FIG. 4 is placed into a frame, to develop a magnet and frame assembly, such as similar to magnet and frame assembly 45 of FIG. 4, without the need for setting and/or sealing paste as the electrolyte used with battery cell apparatus 100 of FIG. 6 is wholly contained in sealed tanks, such as tank 100 of FIG. 7. Magnet and frame 45, such as shown in FIG. 4 or similar, is placed into metal housing 160 of FIG. 6, perhaps with some angular offset, such as 45 degrees away from at least one of cap lug locking opening 164 and 166 of FIG. 9, until at least one electrolyte tank 110 is placed into housing 160 of FIGS. 6 and 9. This design approach allows for simplified assembly of at least one portion of battery 100 of FIG. 6, and offers the option to have two tanks to be wired in series as part of battery 100, such as two tank 110s of FIG. 7. Since the terminal voltage of these types of battery cells, such as at least one battery 100 of FIG. 6, is typically about 1 to 2 volts, a series connection offering a higher voltage, such as at least twice the voltage of single cell.

Figure 8:
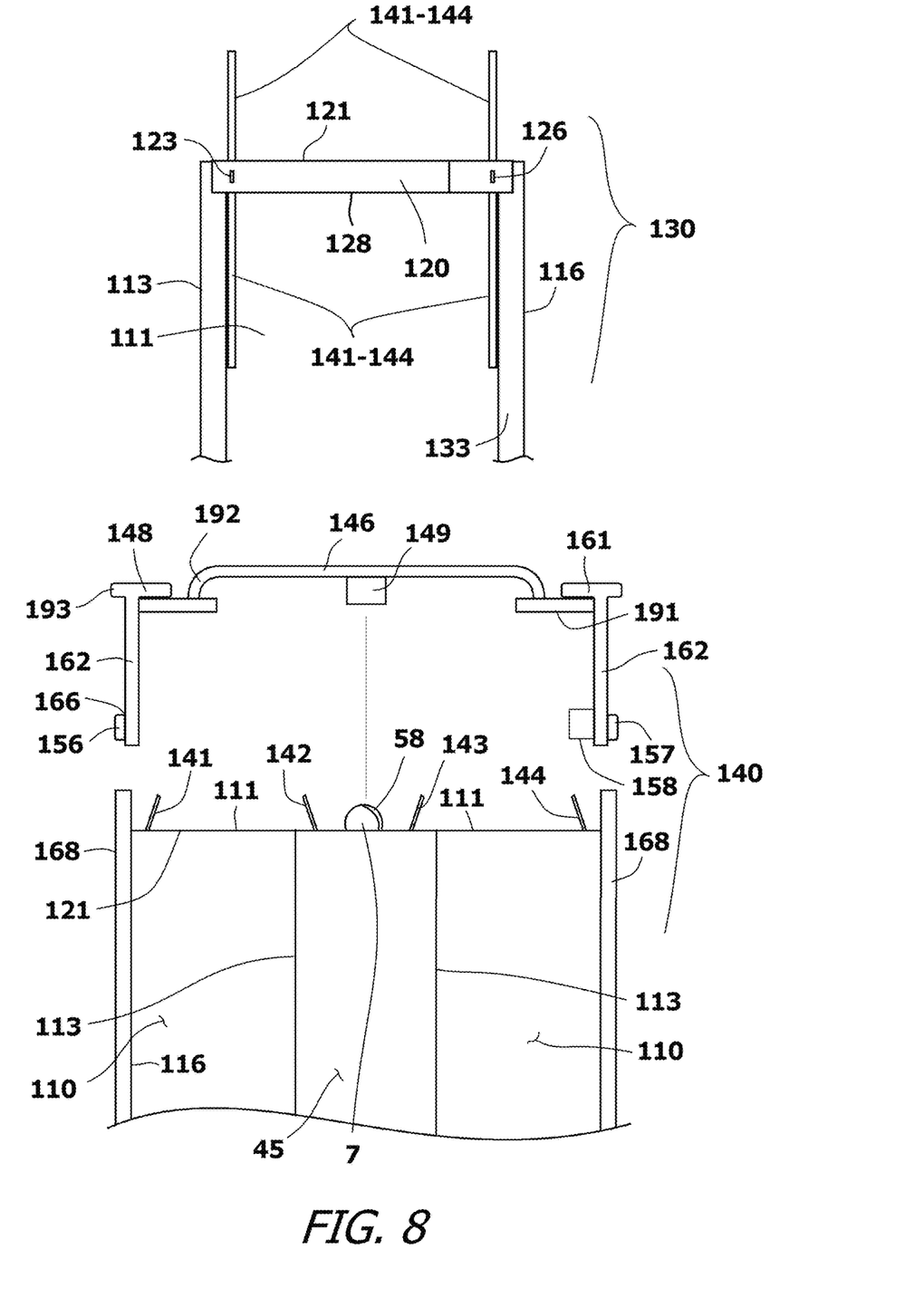
FIG. 8 illustrates detailed side views of a battery cell tank assembly and cell cap assembly to a second exemplary embodiment of the present invention.

Referring FIGS. 6, 7 and 8, tank 110 is comprised of cavity 111, wall 112, wall 113, wall 114, bottom 115, top 117, corner 118, corner 118A, corner 119, corner 119A. Additionally, referring FIGS. 6 and 7, cover 120 is a cover for tank 110, and is comprised of top 121, face 122, opening 123, wall 124, face 125, opening 126, and bottom 128. The at least one electrolyte tank, such as two tank 110s of FIG. 6, may be molded of plastic and arranged in at least one of any number of geometric configurations, such as molded in clear plastic in a half moon geometrical shape. The tank cover, such as cover 120 of FIG. 7 may be molded separately.

Referring FIGS. 6 and 7, the flat side of tank 110, such as at least one portion of wall 113 is at least one of mated and parallel with the flat side of magnet 51 of FIG. 4. Tank 110's curved wall 116 matches the inside profile or curve of housing 160. Thin vertical slots such as slots 123 and 126 of FIG. 7 are molded into each of the tank's top 120. Thin conductive sheets such as at least one of electrode 141, 142, 143 and 144 (the tank's electrodes) can be slid into position thereinto tank 110 (such as a narrower sheet on inner flat side 13 of tank 110 and a wider sheet on the longer curved side facing the inside wall of tank 110), such as illustrated in FIG. 8. After the electrodes are cemented into position inside the two 110 tanks of FIG. 6 with a water-resistant bonding agent, the tank 110s can then be filled with electrolyte up to just below magnet 7's top 158.

Referring FIG. 8, post 149 of cell cap assembly 140 is one terminal of the battery, such as a positive terminal of battery 100 of FIG. 6. In the present exemplary embodiment, battery 100's positive terminal is connected to positive electrode 142 and positive electrode 143 and post 149. An electrode in this current exemplary embodiment is electrically conductive, such as by allowing at least one of current flow and electron flow and the flow of electrons through the electrode. Post 158 of FIG. 8, is electrically connected to at least one portion of housing 160, such as wall 162, providing the negative side of battery 100. A terminal can be connected to any portion of housing 160 to provide a negative connection point for battery 100 such as to provide a connection point for any load connected to battery 100. Referring FIG. 8, negative electrodes 141 and 144 and post 158 are connected in series to provide the negative electrode of battery 100. Interface 192 of FIG. 8, where the positive side of battery 100 of FIG. 6 such as top 146 and post 149 are electrically connected, and also insulated from the negative side of battery 100 by an insulator, such as a rigid insulative washer bonded between top 146 and battery 100's housing such as at least one of housing sections 147 and 148 of FIG. 8.

Referring FIG. 8, positive electrodes 142 and 143 are located in the strong dense portion of magnet 7's electromagnetic field, such as illustrated by electrode 14 and 14A as shown in FIG. 2. Alternately, negative electrodes 141 and 144 are located in the thin, weak areas of magnet 7's electromagnetic field, such as illustrated by electrodes 16 and 16A of FIG. 2.

In the present exemplary embodiment as shown of FIG. 6, the vertical size of tank 110 is made relative to the magnet size, such as magnet 7's vertical height and/or length, so the top of the electrolyte in tank 110 is kept just below magnet 51's top, such as top 58 of FIG. 8 of the magnet to keep the ions within the magnetic field, such as field 13 of FIGS. 1 and 2. Each of tank 110's covers, cover 120, has openings 123 and 126 of FIG. 7, (one for each electrode and/or terminal tab). After cavity 111 of tank 110 has been filled with electrolyte, such as up to a visual mark or other indicia provided on tank 110, the electrodes, such as at least one of electrode 141, 142, 143 and 144, are passed through the slot openings 123 and 126 of FIG. 7 so that the tank cover 120 and at least one of openings 123 and 126 and the electrode openings 123 and 127 can be sealed in place using a sealant such as epoxy. Each electrolyte tank 110 is sealed to prevent loss of battery 100's electrolyte, such as nonhazardous electrolyte. Also, at least one of battery cell apparatus 100 of FIG. 6 and battery cell apparatus 50 of FIG. 3 provides little to no threat of chemical fires as compared with at least other commercially available batteries, such as batteries employing lithium metal.

After the sealing the 110 tanks and before the tank 110's are placed into cell housing 160, at least one of wiring or other means of providing the electrical connections for battery 100 as described herein are provided for battery 100. The at least one of wiring and electrical connections of battery 100 may incorporate at least one electrical-insulator such as a slip-on electrical insulator as well as the use of a slip-on electrical insulator terminal, such as a flag terminal, and may be placed and/or set in place such as by crimping, soldering, adhering, others not mentioned here. Each wire and or wiring assembly of battery 100 is insulated to prevent accidental short circuits and customized for their specific final connections. As an example, one wire assembly with a flag terminal on both ends and proper length for a series connection of the two 110 tanks, such as a series connection between positive electrodes 143 and 142. Additionally, a wire assembly with a flag terminal may connect negative electrodes 144 and 141 in series. Another wire assembly may have also provide a terminal, such as a flag terminal, on both ends and proper length for a connection to the negative post and/or terminal of cell cap assembly 140, such as post 158 of FIG. 8. Additionally, two other wire assemblies may optionally provide for connecting at least two cells and/or battery cells in parallel.

After the electrode tabs 141, 142, 143 and 144 have had a wire assembly crimped onto them, the electrolyte tank 110s can now be placed into housing 160 such as a conductive metal housing. The positive electrode wire assembly post and/or terminal 149 of FIG. 8 is connected, such as crimped onto the post 149 on the bottom of the positive top plate 146. The negative electrode wire assembly terminal is crimped onto post 157 of FIG. 8 on the inside wall of the cell cap assembly 140. Finally, the cell cap assembly 140 is inserted into the top of housing 160 and pushed down to allow at least one alignment lug such as at least one of lug 156 and 157 of FIGS. 6 and 8 on the flank of cell cap assembly 140 to engage with at least one of one opening on the wall of housing 160, such as opening 164 and 167 of wall 162 as shown in FIGS. 6, 8 and 9. Both the cell cap 140 assembly and the cell housing 160 may be marked to assist in lining up the at least one alignment lug, such as lug 156 and 157 with at least opening such as 164 and 167 of FIGS. 8 and 9. Battery 100 also referred to a as a cell and/or battery cell, can be attached to a load, such as an external electrical load, as well as be connected with at least one additional battery and/or battery cell and/or into a group of cells, such as additional battery 100's to form a larger battery.

An alternate cell type for use in large battery packs (where higher current or high voltage is needed) is the curved cell design. In this area of application, the cell consists of only the two electrodes (one magnetic ferrite positive and one copper negative), a thin electrode spacer and the electrolyte. The cells are positioned externally on a rack (a frame holding multiple cells individually spaced in a row for series connections) so that cells can be positioned on both sides of the rack. This type of assembly allows warm air or liquid to be circulated around the cells to counteract the cells' endothermic reactions and thus maintain their full capacity over extended discharge periods.

What is claimed is:

1. A battery cell apparatus comprising:
   a reservoir containing electrolyte, the electrolyte comprising a redox couple comprising paramagnetic and diamagnetic ions;
   a magnet having at least one magnetic pole, projecting a non-uniform magnetic field thereunto the electrolyte, the magnetic field of the electrolyte having a strong magnetic field area proximal to the magnetic pole and a weak magnetic field area distal to the magnetic pole and strong magnetic field area;
   a positive electrode immersed in the electrolyte proximal to the strong magnetic field area;
   a negative electrode immersed in the electrolyte proximal to the weak magnetic field area;
   ionic separation of the paramagnetic ions through attraction and drifting to the strong magnetic field area of the electrolyte and the positive electrode;
   ionic separation of the diamagnetic ions through the diamagnetic ion repulsion from the magnetic pole and drifting to the weak magnetic field area of the electrolyte and negative electrode; and
   a voltage potential across the positive and negative electrodes of the battery raised by the ionic separation of the diamagnetic and paramagnetic ions, whereby an electrical circuit placed across the positive and negative electrodes of the battery flows electrons from the diamagnetic ions through the negative electrode and the electrical circuit to the positive electrode and into the paramagnetic ions.

2. The battery cell apparatus of claim 1, whereby paramagnetic ions proximal to the strong magnetic field area oxidize into converted diamagnetic ions as the paramagnetic ions receive electrons through the positive electrode, the converted diamagnetic ions repelled by the magnetic pole drift to the weak magnetic field area;
   diamagnetic ions proximal to the weak magnetic field area reduce into converted paramagnetic ions as the diamagnetic ions lose electrons through the negative electrode, the converted paramagnetic ions attracted to the magnetic pole drift to the strong magnetic field area.

3. The battery cell apparatus of claim 1, whereby the magnet is contained in at least one of inside the battery cell apparatus and outside the battery cell apparatus.

4. The battery cell apparatus of claim 2, whereby the magnet is contained in at least one of inside the battery cell apparatus and outside the battery cell apparatus.

5. The battery cell apparatus of claim 4, whereby the reservoir is an elongate cavity and the magnet is an elongate shape positioned within the reservoir; and
   at least one of the larger surfaces of the elongate magnet contains the at least one magnetic pole.

6. The battery of claim 4, whereby at least one of at least one portion of the reservoir is metallic and is at least one portion of the of the negative electrode of the battery cell.

7. The battery cell apparatus of claim 5, whereby the reservoir is cylindrically shaped.

8. The apparatus of claim 5, whereby the magnet is conductive and is at least one portion of the positive electrode.

9. The apparatus of claim 7, whereby the magnet is conductive and is at least one portion of the positive electrode.

10. The battery apparatus of claim 5, whereby at least one portion of the battery cell apparatus of claim 5 is connected in at least one of in series with and in parallel with at least one portion of another battery cell apparatus of claim 5.

11. The battery of claim 5, whereby the oxidizing of paramagnetic ions into converted diamagnetic ions; and
    the reducing of diamagnetic ions into converted paramagnetic ions of the battery cell apparatus is endothermic and cools the electrolyte.

12. The battery of claim 5, whereby the oxidizing of paramagnetic ions into converted diamagnetic ions; and
    the reducing of diamagnetic ions into converted paramagnetic ions of the battery cell apparatus is endothermic and cools the electrolyte.

13. The battery of claim 4, whereby the positive electrode is at least one of chemically inert and coated with a chemically inert material.

14. A battery cell system comprising:
    a reservoir containing fluid electrolyte, the electrolyte comprising a redox couple comprising paramagnetic and diamagnetic ions of the same species;
    a permanent magnet having at least one magnetic pole, the permanent magnet projecting a non-uniform magnetic field thereunto the electrolyte, the magnetic field of the electrolyte having a strong magnetic field area proximal to the magnetic pole and a weak magnetic field area distal to the magnetic pole;
    a positive electrode in the electrolyte of the strong magnetic field area;
    a negative electrode in the electrolyte of the weak magnetic field area;
    ionic separation of the paramagnetic ions through attraction and drifting to the strong magnetic field area of the electrolyte and the positive electrode;
    ionic separation of the diamagnetic ions through the diamagnetic ion repulsion from the magnetic pole and drifting to the weak magnetic field area of the electrolyte and negative electrode;
    voltage potential across the positive and negative electrodes of the battery raised by the ionic separation of the diamagnetic and paramagnetic ions, whereby a circuit placed across the positive and negative electrodes develops electrical current flow from the diamagnetic ions through the negative electrode and the electrical circuit to the positive electrode and into the paramagnetic ions;
    converting paramagnetic ions proximal to the strong magnetic field area by oxidizing into converted diamagnetic ions as the paramagnetic ions receive electrons through the positive electrode, the converted diamagnetic ions repelled by the magnetic pole drifting to the weak magnetic field area; and converting diamagnetic ions proximal to the weak magnetic field area reducing into converted paramagnetic ions as the diamagnetic ions lose electrons through the negative electrode, the converted paramagnetic ions attracted to the magnetic pole drifting to the strong magnetic field area.

15. The battery cell apparatus of claim 14, whereby the magnet is contained in at least one of inside the battery cell apparatus and outside the battery cell apparatus.

16. The battery cell apparatus of claim 15, whereby at least one of the oxidizing of paramagnetic ions into converted diamagnetic ions, and the reducing of paramagnetic ions into converted diamagnetic ions of the battery cell apparatus is endothermic and cools the electrolyte.

17. The battery of claim 16, whereby at least one of at least one portion of the reservoir is metallic and is at least one portion of the of the negative electrode of the battery cell.

18. The apparatus of claim 16, whereby the magnet is conductive and is at least one portion of the positive electrode.

19. The battery cell apparatus of claim 16, whereby the reservoir is an elongate cavity and the magnet is an elongate shape positioned within the reservoir; and at least one of the larger surfaces of the elongate magnet contains the at least one magnetic pole.

20. The battery cell apparatus of claim 16, whereby the positive electrode is at least one of chemically inert and coated with a chemically inert material.

21. The battery cell apparatus of claim 16, whereby the reservoir is cylindrically shaped.

* * * * *